United States Patent [19]

Huber et al.

[11] 3,973,859

[45] Aug. 10, 1976

[54] AUTOMATED DRILLING SYSTEM

[75] Inventors: John G. Huber, Sayville; William B. Grauer, Babylon, both of N.Y.

[73] Assignee: Grumman Aerospace Corporation, Bethpage, N.Y.

[22] Filed: Feb. 24, 1975

[21] Appl. No.: 552,295

[52] U.S. Cl. .............................. 408/12; 90/15 R; 90/17; 408/237
[51] Int. Cl.² ...................................... B23B 39/14
[58] Field of Search ................ 408/12, 13, 14, 187, 408/236, 237; 144/106; 90/15 R, 17; 173/43, 44

[56] References Cited
UNITED STATES PATENTS

| | | | |
|---|---|---|---|
| 2,823,591 | 2/1958 | Craddock et al. | 90/17 X |
| 3,264,906 | 8/1966 | Swords | 408/12 |

*Primary Examiner*—Othell M. Simpson
*Assistant Examiner*—Z. R. Bilinsky
*Attorney, Agent, or Firm*—Morgan, Finnegan, Pine, Foley & Lee

[57] ABSTRACT

A compound curvature workpiece is secured in a fixture and scanned to detect position variations by an optical camera carried by a manipulator head. The manipulator head is driven in the X, and Y direction and includes an annular piston for movement in the Z direction. The manipulator head has a spherical bearing adjacent the workpiece which cooperates with α, and β angle drives to position the camera or tools perpendicular to the workpiece. Position variations detected by the scan camera are utilized to provide accurate coordinates for a tool, such as a drill, which is substitute for the camera after scanning is complete.

The present invention relates to the field of machine tool assemblies, and more particularly, to the manipulation of tools for operating on workpieces having compound curvature surfaces, such as aircraft structures.

12 Claims, 11 Drawing Figures

AUTOMATED DRILLING SYSTEM

BACKGROUND OF THE INVENTION

A significant factor in the fabrication of aircraft structures is the cost encountered in preparing holes to accept the wide variety of fasteners used. The large number of holes involved (250,000 to 400,000 for a fighter aircraft and 1 or 2 million for bomber and transport aircraft) means that this manufacturing task has become a major production cost area. Over the past 20 years, major improvements have been made in automating various processes in the aerospace industry. Drilling of subassemblies can be accomplished with automatic drilling and riveting equipment which can drastically reduce manufacturing costs. Unfortunately, a major portion of the drilling must be performed in assembly fixtures on the production floor. These drilling operations are still performed manually because the equipment and controls to realize the potential economic benefits of an automated system have not yet been developed. The system must be capable of operating in five axes of motion to drill contoured skins of the aircraft structure and be able to automatically adjust for the minor variations in understructure positioning.

The concept of an automated assembly fixture drilling system is truly generic. Such a system would be able to reduce manufacturing costs on composite and metal structures, large and small aircraft and rebuilding facilities.

The most apparent approach to the problem of automating assembly drilling operations would be to build a multi-axis numerically controlled or computer controlled drilling work station. However, this has been found to be a superficial answer for aircraft structure drilling since it in itself would not compensate for variations in actual structure position. It would require a complex programing system and become a major piece of capital equipment which would be severely under utilized since there are many non-drilling operations required in such an assembly fixture. These factors coupled with the trend in recent years for aircraft to become more sophisticated with hundreds of thousands of holes and relatively low production rates has economically eliminated the practicality of such specialized high cost equipment.

A major obstacle to the automation of aircraft structure assembly fabrication in the past has been an inability to recognize that minor structure position variations occur on the assembly floor for which the mechanic makes the necessary tooling adjustments to maintain proper edge distance. An automated drilling assembly with a conventional gimbaled drive system is unsatisfactory since it is costly, fragile and difficult to hold in proper position.

SUMMARY OF THE INVENTION

The present invention overcomes the difficulties in drilling compound curvature workpiece by scanning the piece with an electro-optical system capable of providing data to control computer for subsequent drilling or other operations, such as welding.

THe principal components associated with the automated drilling assembly of the invention are a drilling unit; an optical scanner unit, $\alpha$, $\beta$, Z manipulator head, the vertical transfer carriage and the longitudinal drive system.

The workpiece is installed in a fixture equipped with a manipulator head in the present invention. Predetermined position data is fed to a control system to move the manipulator over selected edges of the piece structure. A scanning camera compares the actual edge position to the data edge position to provide a position error. This position error is then utilized to change the position data to working data. After the position data has been established the camera is removed from the manipulator head and replaced with the drill unit.

The central control system then utilizes the working data to accurately position the drill for the drilling operation.

The manipulator carries the drill in a spherical bearing coupled with a fluidic sensing system. Two axes, $\alpha$, $\beta$ drives cooperate with the spherical bearing to maintain the point of rotation, a fixed distance from the contoured workpiece to provide precise angular positioning without special components.

The manipulator head includes an annular piston in which the scan camera and drill are mounted for accurate positioning thereof in the Z direction. A locking cylinder cooperates with the annular piston to lock the manipulator in position with minimum overshoot.

DETAILED DESCRIPTION OF A PREFERRED EMBODIMENT

While this invention is susceptible of embodiment in many different forms, there is shown in the drawings and will hereinafter be described in detail a preferred embodiment of the invention with the understanding that the present disclosure is to be considered as an exemplification of the principles of the invention and is not intended to limit the invention to the embodiments illustrated.

OVERALL SYSTEM

Figure 1:
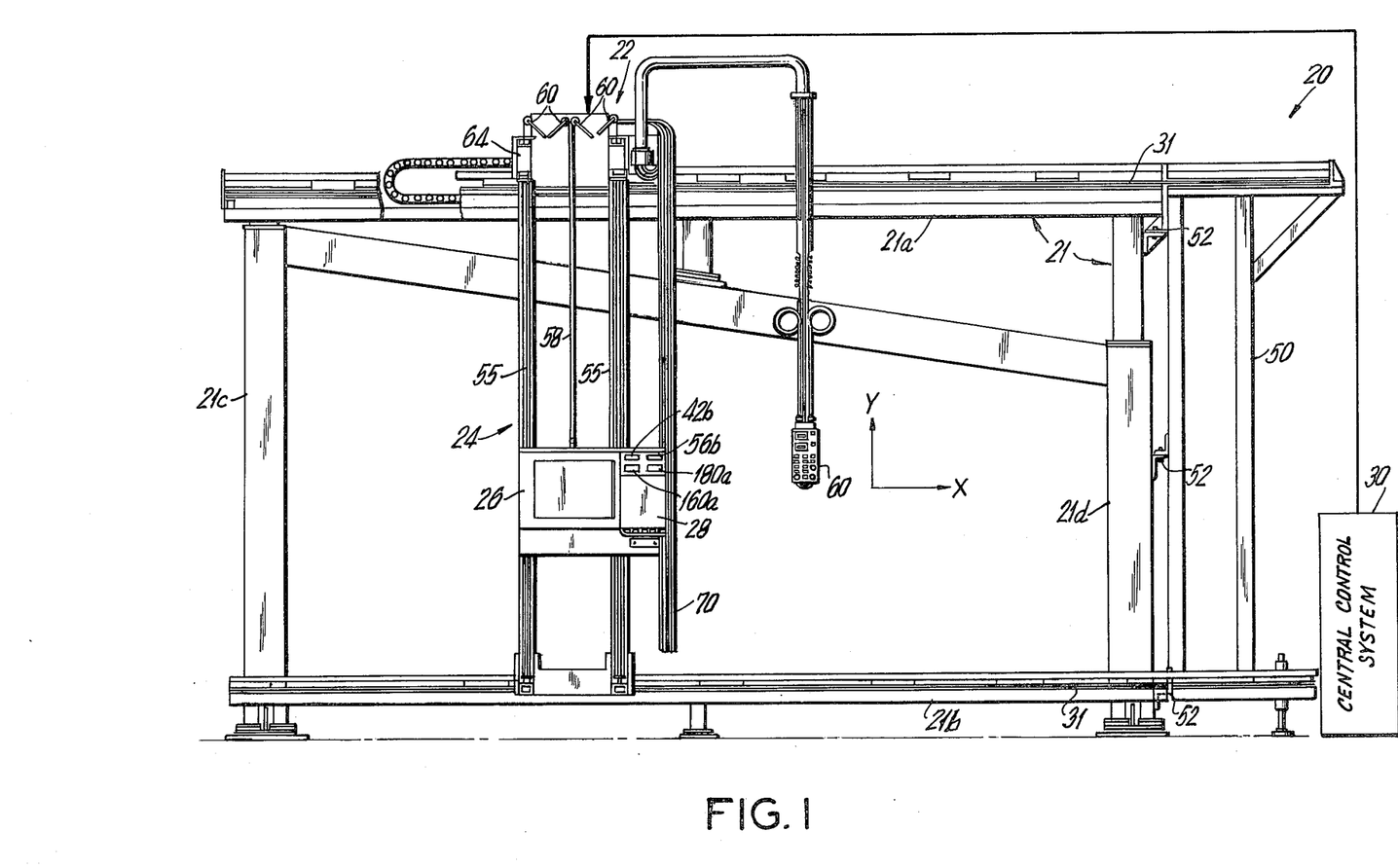
FIG. 1 is a front, elevation view of a drilling fixture with the automatic drilling system according to the present invention.
Figure 2:
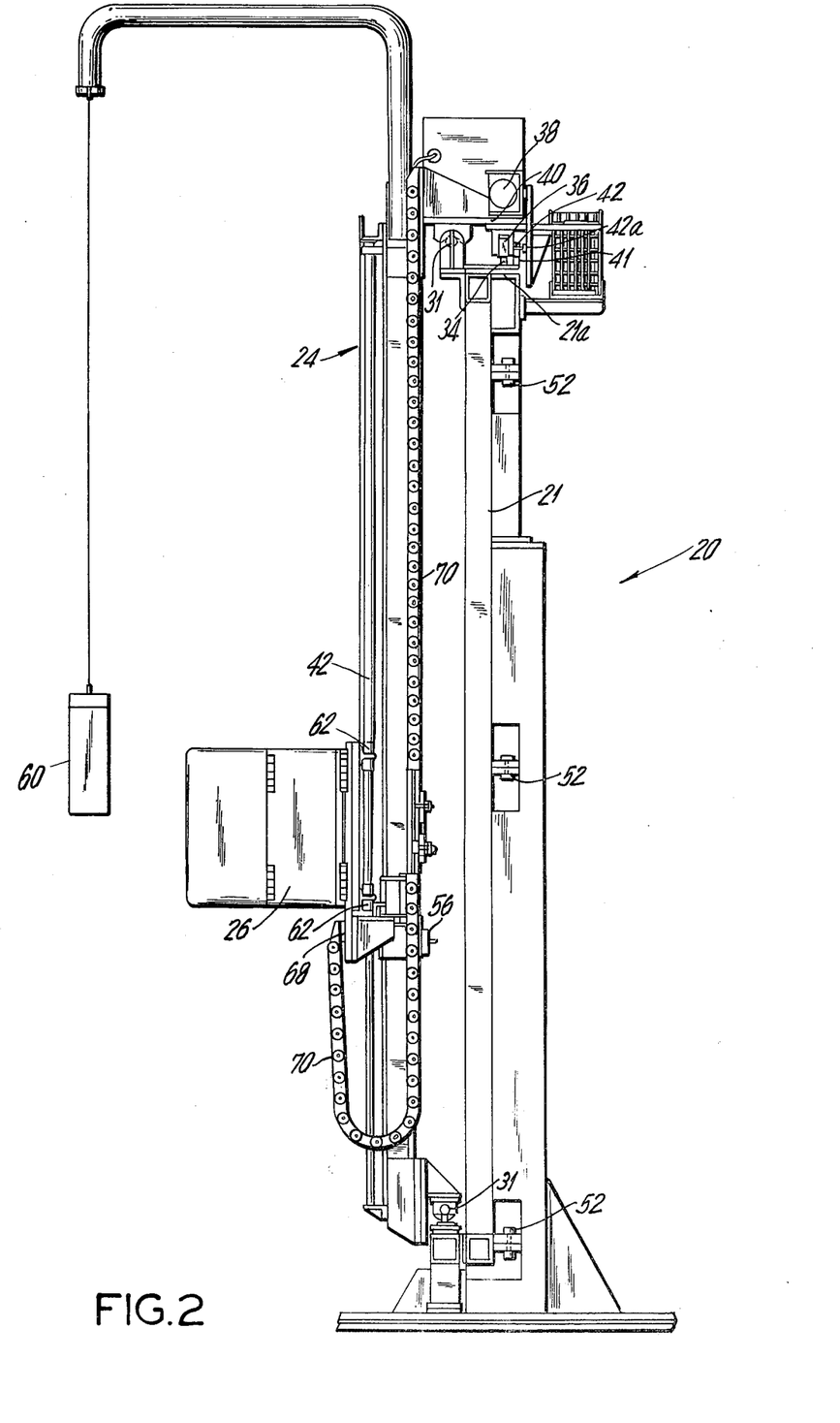
FIG. 2 is an end elevation view of the fixture of FIG. 1.

FIGS. 1 and 2 illustrate the overall drilling system 20 of the present invention which includes a workpiece fixture 21, a horizontal drive system 22, a vertical transfer carriage 24, a manipulator head 26, fluidic controls 28, and a central control system 30.

Fixture 21, as illustrated, is of the type normally used for machining aircraft wing sections, and it will be appreciated that other fixtures for different workpieces may also be used. Fixture 21 includes horizontal channel members 21a and 21b, which are interconnected by laterally, spaced-apart vertical channel members 21c and 21d. A wing structure piece (not shown) which is to be drilled, is positioned and held by fixture 21 so that it may be operated upon by tools carried by manipulator head 26, described in detail below.

Fixture 21 is modified to include top and bottom, longitudinally extending, guide rails 31 on which transfer carriage 24 rides. Longitudinal drive system 22 includes a rack 34 mounted on the upper surface of horizontal member 21a of fixture 21 and a pinion drive 36, which is powered by a conventional stepper drive motor 38. Drive motor 38 is controlled by the central control system 30, described in detail below. In this manner, carriage 24 may be moved from left to right as viewed in FIG. 1, to thus control the X position of the manipulator head 26.

To provide a control parameter for the position in the X direction of the carriage, a precision rack 41 and mating pinion 42 are provided. The rotation of pinion 42 is coupled with an encoder 42a to provide a position feedback system to the central control system and display 42b (FIG. 8) and thereby inform the control system of the exact position of the carriage.

As will be described in greater detail below, the transfer carriage and manipulator head are designed to be modular and adapted to be used on several fixtures. To this end, a carriage transfer structure 50 is provided at the right hand portion of fixture 21 (as viewed in FIG. 1). Structure 50 is detachably secured to fixture 21 by means of pins 52 so that when the carriage is positioned in the extreme right hand position, as viewed in FIG. 1, the carriage may be detached from its associated controls and moved to a second remote fixture, coupled to that fixture's control system and utilized while the workpiece in the original structure is removed or sujected to further machining not requiring the manipulator head.

Vertical transfer carriage 24 is the largest modular in the system and holds the manipulator head for Y direction motion. The transfer carriage moves the manipulator head 26 in the Y direction by means of a rack and pinion driven stepper motor 56. A precision rack and pinion, similar to that described in connection with rack and pinion 41 and 42 is also provided for driving a position feedback encoder (not shown) and display 56b.

Manipulator head 26 is suspended on carriage 24 by means of a counterbalance system defined by cables 58 which extends upwardly from the manipulator head about a pair of pulleys 60 and are attached to vertically movable counterweights 64 which slide within (vertical carriage frame) 55 to minimize the loading on the drive rack gear.

The operational mode is controlled from operator pendant 60.

POSITION DATA GENERATION

A master coordinate map for use as initial scan position data is created by existing computer aided design techniques as is known in the art. Briefly, the air passage surfaces of the aircraft are defined as mathematically bounded conic sections. The computer aided design program uses the conic section definitions to create the master coordinate map after the appropriate translation and rotation of coordinates. Rotation and translation is necessary in order to reference the corridnates with respect to the drilling fixture zero points.

The control system program provides for drilling and countersinking of holes on compound contoured skins with $\alpha$ and $\beta$ angle motions of $\pm 9°$ although greater angles may be accommodated by structural modification. An optical scan mode is incorporated by utilizing a digitizing camera to measure hole-to-edge distances (described below). The information received from the camera is used to modify theoretical drill coordinates, correcting for minor variations in the understructure.

The control system software is designed to correct the basic coordinates for minor position variations in the placement of the components to be drilled. This is required, since, due to the build up of tolerance in the subassembly fabrication, the stringers, beams, ribs, clips, etc. will generally be placed with an uncertainty in position of about $\pm 1/8$ to $\pm 3/16$ inches. This uncertainty in positions can be the direction that does not allow holes to be placed automatically under N/C control. If a method is not provided for adjusting the hole to the actual built up position of the under structure, the required hole edge distance will not be maintained and, the drill may put a hole closer, or further from the edge, than the tolerance will allow, a typical tolerance being $\pm 1/16$ inch.

The automated drilling system of the invention first scans the understructure (workpiece) with a digital scanning camera looking at the edge of the stringer, rib, etc. The data from the camera will then be used to correct the nominal drill coordinate (known as the master coordinate map). These corrected coordinates are then used to automatically position a drill head for this part. Although the master coordinates are for the nominal placement of the holes, the camera must be positioned at the edge of the stringer, since it works on the principal of detecting reflected light. The offset of the camera, from the hole center, to the edge of the struture, is handled by the computer. The computer also corrects the Z dimension for the angles $\alpha$ and $\beta$, and corrects the X, and Y dimensions for the camera focal length.

Once the camera is in position, the actual edge is scanned, and this information, sent to the computer. If the structure is in the correct place, a reading of 256 will be received from the camera controller, or error = 0 indicating that half of the 512 photo diodes are in light, and half are in dark. The camera generated information will be used by the computer to calculate how much ($\Delta D$) to move the hole coordinates to accommodate for the actual placement of the understructure. The formulas used for the correction depend on the orientation of the stringer $\rho$, and the direction of the edge. The camera diode array will be placed vertically for stringer angles $-45° \leq \rho \leq 45$ and rotated to the horizontal position for angles $90 \geq \rho > 45$, or $-90° \leq \rho < -45°$.

MANIPULATOR HEAD AND DRILL UNIT

The manipulator head and drill unit are the most basic modules in the present invention. The drill unit is easily interchanged with a digitizing camera, as will be described in greater detail below.

Figures 3, 4:
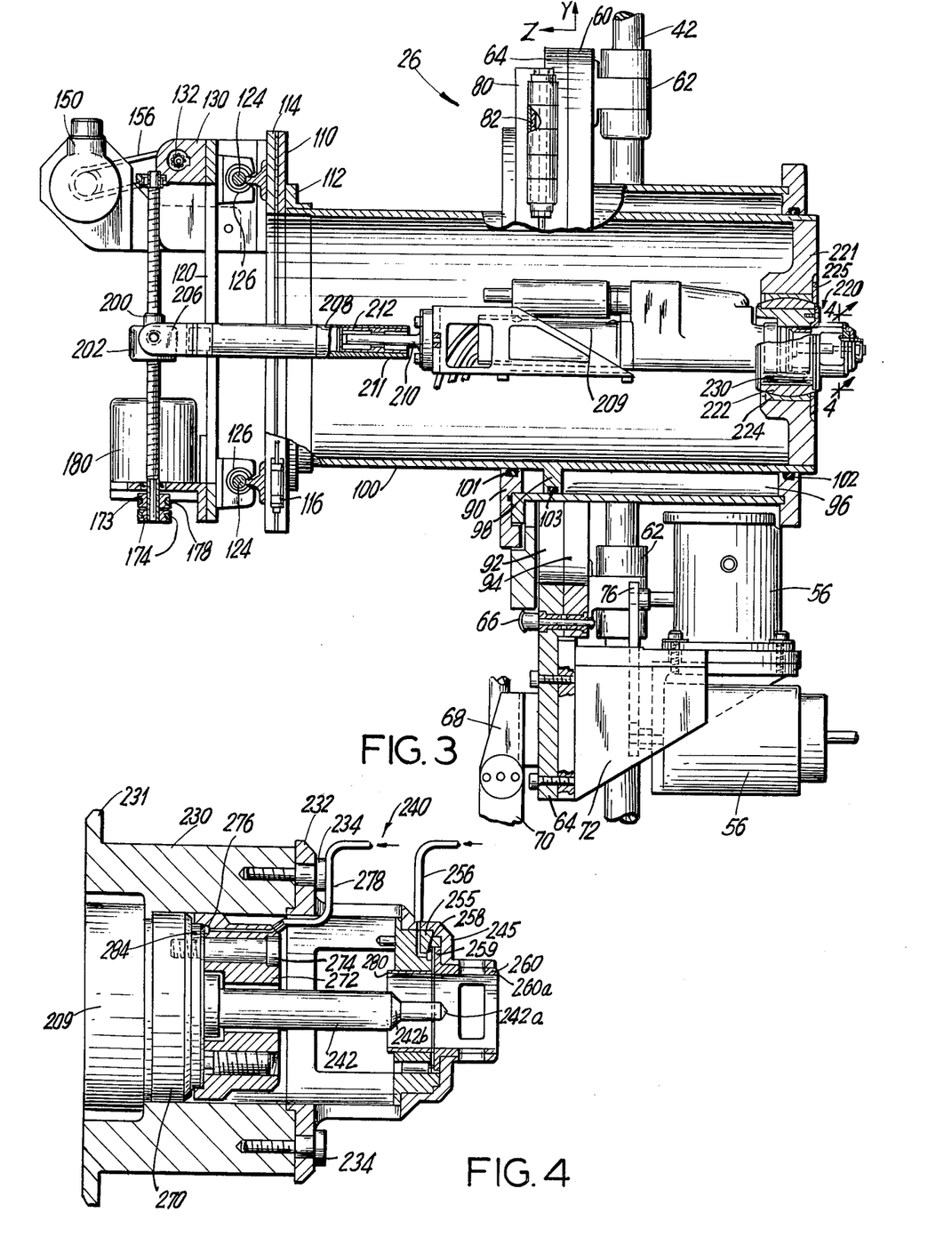
FIG. 3 is an enlarged, cross-sectional view of the manipulator head assembly with a drill installed.
FIG. 4 is an enlarged, cross-sectional view of the surface sensing apparatus taken along line 4—4 in FIG. 3.

Referring now to FIG. 3, manipulator head 26 includes a vertical base plate 60 on which are mounted linear motion bearing blocks 62 which support the manipulator head from rails 42 on vertical carriage frame 55. Overlying mounting plates 60 is a mounting base plate 64 which is releasably secured thereto by means of pull pins 66 so that the entire manipulator head may be removed from plate 60. Plate 64 includes mounting bracket 68 for the control wires extending from flexible conduit 70. Extending inwardly toward the fixture from plate 64 is a triangular shape bracket 72 upon which is mounted a vertical position encoder and stepper drive motor 56.

Figure 5:
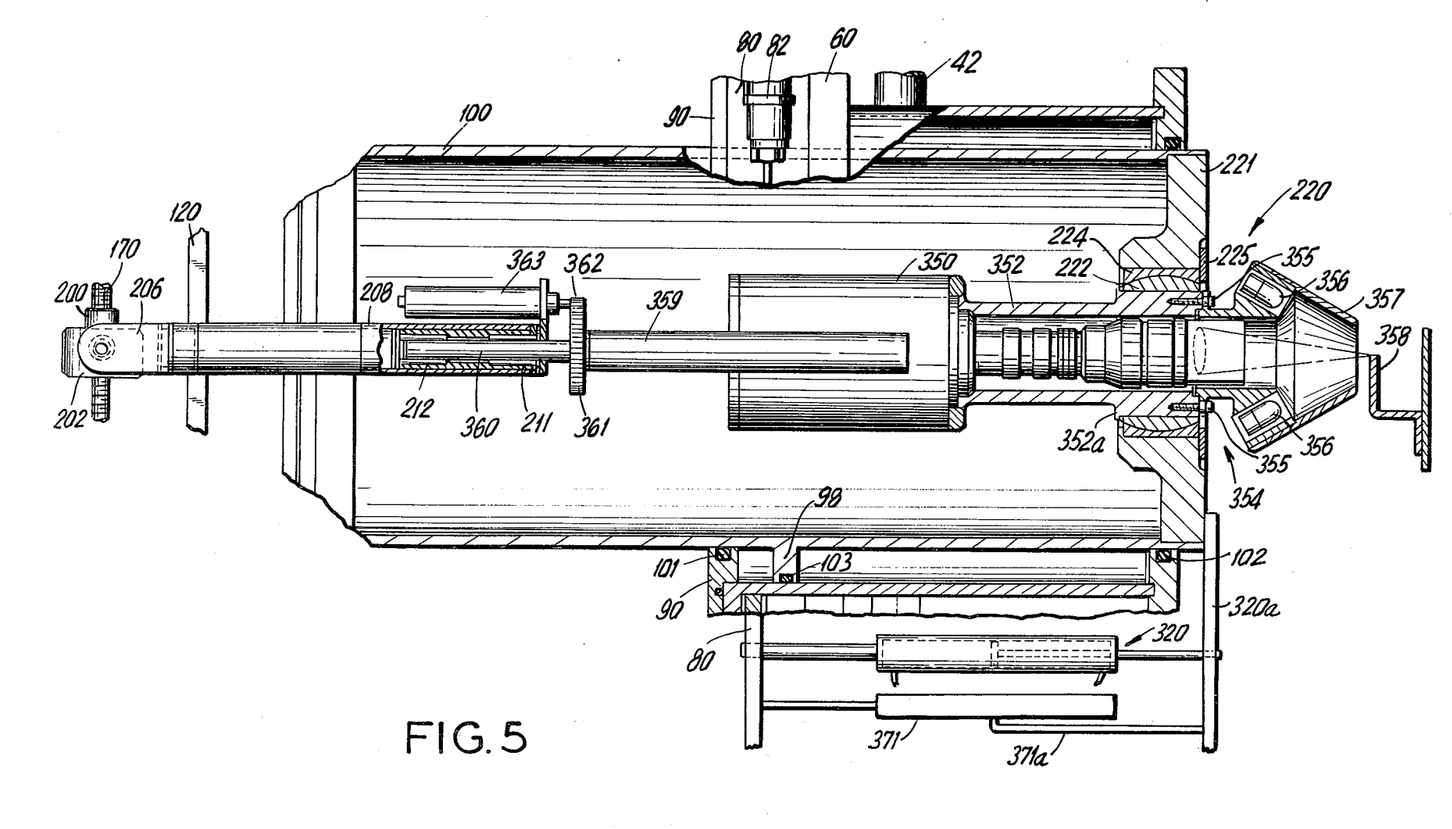
FIG. 5 is an enlarged, cross-sectional view of the manipulator head assembly, similar to FIG. 3, with a camera installed.
Figure 9A:
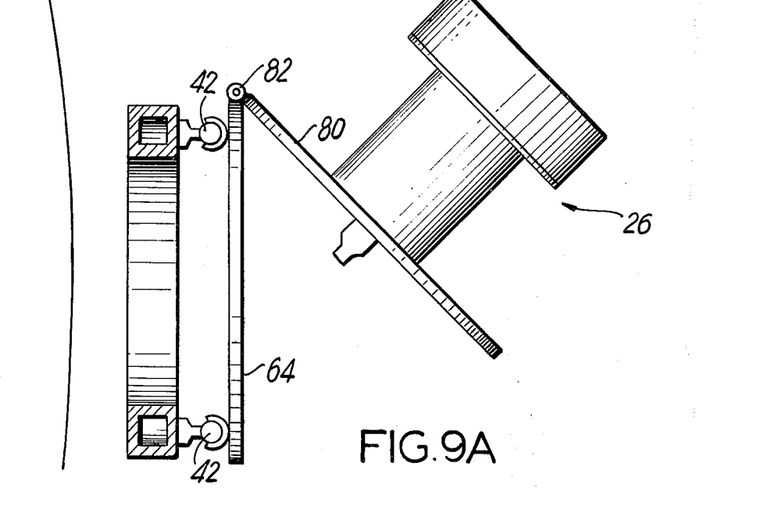
FIGS. 9A and 9B are schematic, top, plan views illustrating the hinged access to the manipulator head.

A carrier plate 80 is pivotally attached to plate 64 by means of hinges 82 on the right side of the manipulator head (as viewed in FIGS. 3 and 5). Plate 80 is also releasably retained in contact with plate 64 by means of pull rings 81 similar to pull rings 66 so that the manipulator head may be swung to a clearance position as illustrated in FIG. 9A to provide access to the front of the head.

Movement of the manipulator head in the Z direction is provided by an annular cylinder 90 mounted on plate 80 and extending inwardly toward the fixture through clearance holes 92 and 94 in plates 64 and 60, respectively. Annular cylinder 90 includes a chamber portion 96 in which slides an annular piston 98. Annular piston 98 is formed on the outer surface of the cylindrical housing 100 which forms the principle portion of the manipulator head. Annular cylinder 90 is maintained in sealing engagement with cylindrical portion 100 by means of O rings 101 and 102, and annular piston 98 is maintained in sealing engagement with the interior of annular piston 90 by means of O ring 103. The central control system operates piston 98 by introducing pressurized fluid such as hydraulic oil or air on either side of piston 98 to cause the piston to move either inwardly or outwardly of the workpiece in the Z direction. The actual control system for operating the annular piston will be described in greater detail below.

Figure 9B:
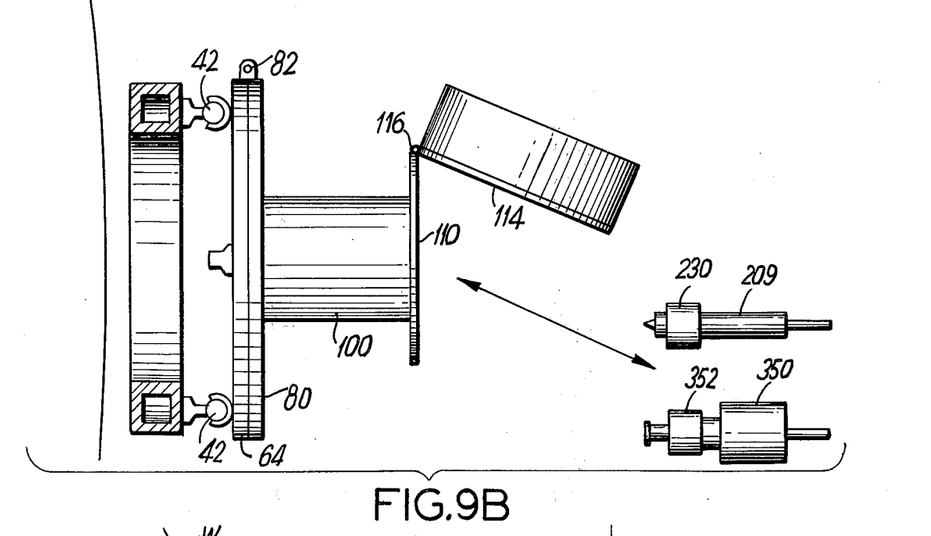

A manipulator mounting plate 110 is secured on the free end of cylinder 100 by an annular L-shaped weldment 112. A carrier plate 114 is hinged to plate 110 on the right hand portion thereof, as viewed in FIG. 6, by means of hinge 117. Plate 114 is detachably secured to plate 110 by pull rings 117 which, when released, allow the plate 114 to be opened relative to plate 110 to provide access to cylinder 100, as shown in FIG. 9B.

Plate 114 supports the assemblies which provide for the angular displacement of the drill and camera, i.e., $\alpha$ and $\beta$ manipulators. To this end, a generally rectangular shape support plate 120 having a rectangular clearance 122 is mounted by means of linear motion bearing 126 on horizontal guide rods 124, which extend from plate 114. Extending outwardly from plate 120 is a pair of laterally spaced-apart members 130 which threadably engage a drive screw rod 132 extending horizontally of the manipulator head, FIG. 6.

Figure 6:
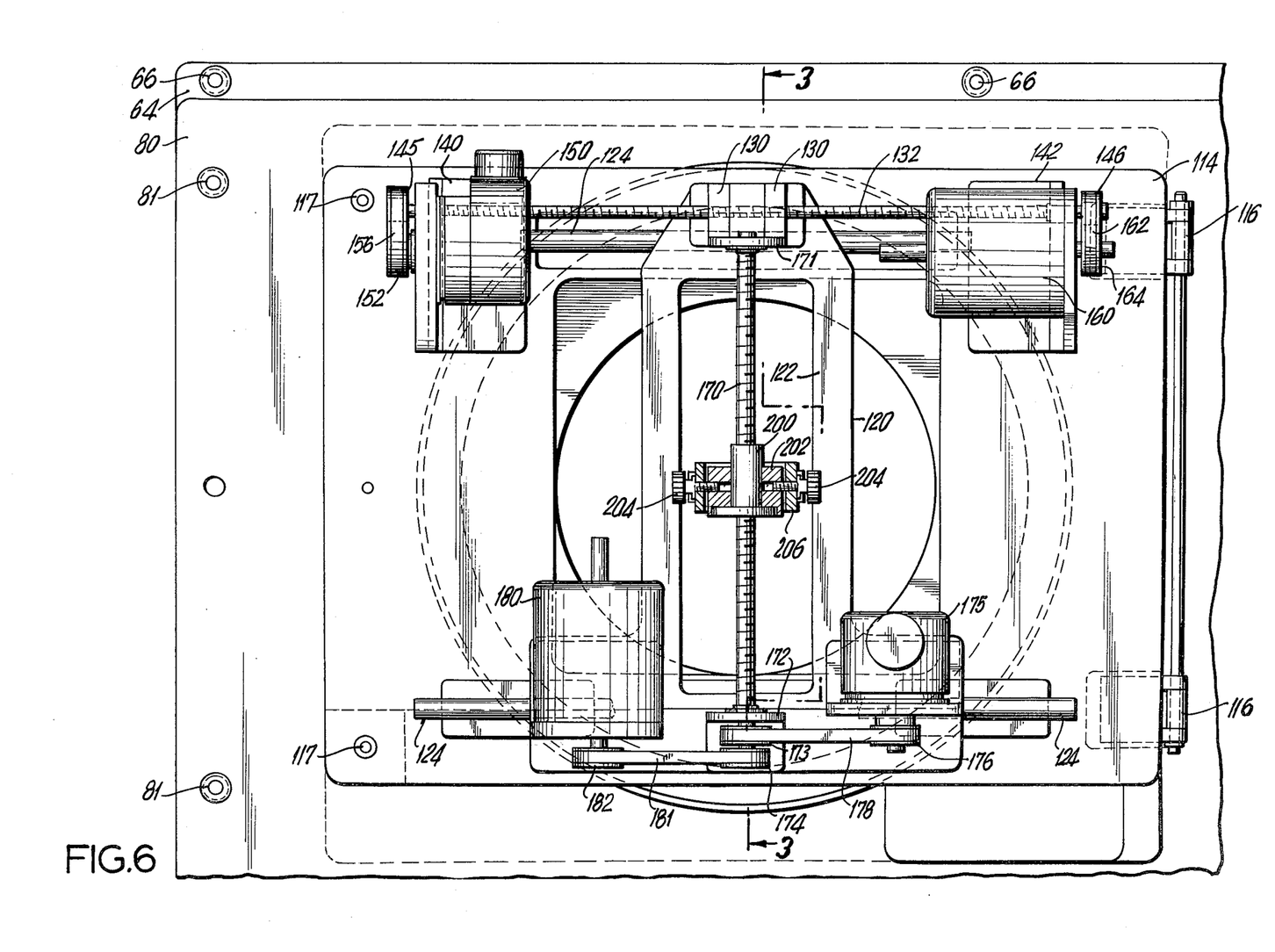
FIG. 6 is an enlarged, front, elevation view of the manipulator head assembly with the cover removed.

Rod 132 is rotatably supported at both ends in L-shaped brackets 140 and 142, and mounts drive pulleys 145 and 146 at each end. Rod 132 is driven by a stepper motor 160 mounted on bracket 142. Motor 160 includes a drive pulley 164 which is interconnected with pulley 146 by belt 162. Stepper motor 160 is controlled by the central control system to move plate 120 and thus vary the $\beta$ angle of the tool. An encoder 150 is mounted on bracket 140 and coupled to rod 132 by means of a drive belt 150 which interconnects pulley 145 and pulley 152 of the encoder. Output from encoder 150 is fed back to register 160a.

The $\alpha$ angle drive is provided by a screw rod 170 which extends across clearance 122 and is rotatably mounted in end brackets 171 and 172, which extend from plate 120. Rod 170 extends beyond bracket 172 to mount a pair of pulleys 173 and 174. Pulley 174 is driven by a stepper motor 180 and associated pulley 182 through belt 181. Pulley 173 drives a data position encoder 175 by means of belt 178 and encoder pulley 176 to provide position indication to register 180a.

Screw rod 170 is threadably engaged with a drive collar 200 which is moved upwardly and downwardly, as viewed in FIG. 6 by stepper motor 180. A boss 202 is mounted concentrically about collar 200 and receives two diametrically opposed followers 204 extending from a yoke 206. With particular reference to FIG. 3, yoke 206 includes an inwardly extending tubular member 208 in which the tool to be manipulated is attached. As illustrated in FIG. 3, a self-powered advancing drill, such as that sold by Rockwell Model No. 31-860 or Quackenbush PDP-15 is fitted with a rod-like adaptor 210 at one end which is received within tubular member 208 and rotatably secured by means of bearings 212. The opposite end of drill 209 is positioned within a spherical bearing assembly 220 located in carrier plate 221, which extends inwardly at the free end of cylinder 100.

Figure 10:
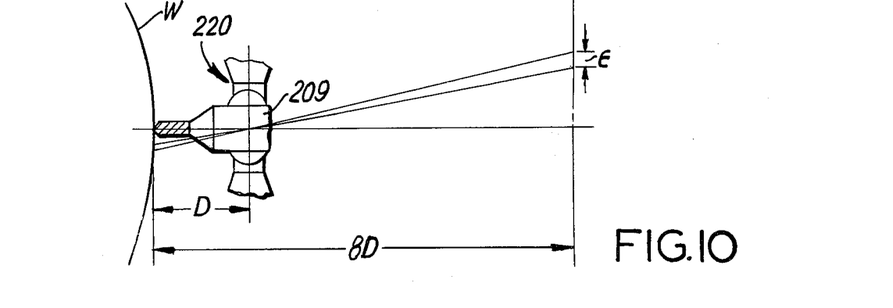
FIG. 10 is a schematic view illustrating the minimized angular error in X, Y position of the manipulator head.

The combination of the bearing assembly 220 adjacent to the drill tip and the extended attachment position for mainpulation at collar 200 for the drill unit substantially minimizes the error in angular manipulation of the drill unit. Referring momentarily to FIG. 10, during the drilling operation, the distance D of the spherical bearing assembly 220 relative to the workpiece surface W is kept at a constant value. The angular manipulation drives will be at a distance of 8 times distance of the drill point to the pivot point distance. In this manner, an error ($\epsilon$) at the output of the angular drive system will be reduced by a factor of 7 at the drill tip. This configuration thus allows for highly accurate positioning of the drill tip which would not ordinarily be possible with a standard gimble type arrangement.

With reference to FIGS. 3 and 5, the spherical bearing assembly 220 includes a shperical bearing 222 rotatably mounted in a complementary bushing 224 which is secured within plate 221 by means of annular retaining plate 225. The end of drill unit 209, FIG. 4, is provided with an adaptor collar 230 which may be slidably inserted into spherical bearing 222. Adaptor 230 is secured within bearing 222 by means of an annular projection 231 at the interior edge and an annular member 232 on nose assembly 240, described in detail below. Member 232 is secured to adaptor 230, after the drill has been inserted into the spherical bearing, by means of fasteners 234.

Nose assembly 240 includes fluidic sensors adapted to position the drill unit at a predetermined distance from the workpiece and to recycle the drill after a countersink has been performed. As shown in FIG. 4 drill 209 includes a combination drill bit 242 having a drill portion 242a and a countersink shoulder 242b.

Nose assembly 240 includes a generally tubular tapered contoured portion 245 within which the fluidic sensors are carried. The first fluidic sensor which is designed to position the spherical bearing pivot point at a predetermined distance from the workpiece, includes an annular member 255 which receives control air from tube 256 and delivers it to a sensor chamber 258 defined by member 255. An annular projection 259 from nose piece 260 overlies chamber 258. Nose piece 260 is slidably carried in member 245 and the leading edge 260a is adapted to engage the surface of the workpiece causing the member to move rearwardly and close with chamber 258 to provide a back pressure for fluidic logic operation. After this position has been sensed, the drill 209 is advanced by its self-contained air cylinder. As the drill advances, chock 270 carried by drill unit 242 advances a fluidic sensor element 272. Element 272 is carried by slide fasteners 274 on chock 270 and includes a fluidic sensing chamber 276 which receives air through tubing 278. As the drill advances, element 272 engages with a tubular member 280 positioned concentrically within member 255. A relative distance between the leading surface of element 272 and the surface of 280 is such that it corresponds to the depth of drilling required to drill and countersink a hole. When element 272 contacts the leading edge of member 280, the element is moved axially relative to fasteners 274 to cause chamber 276 to be closed off by a boss 284, thus providing a back pressure in the fluidic line 278.

FLUIDIC CONTROL

Figure 7:
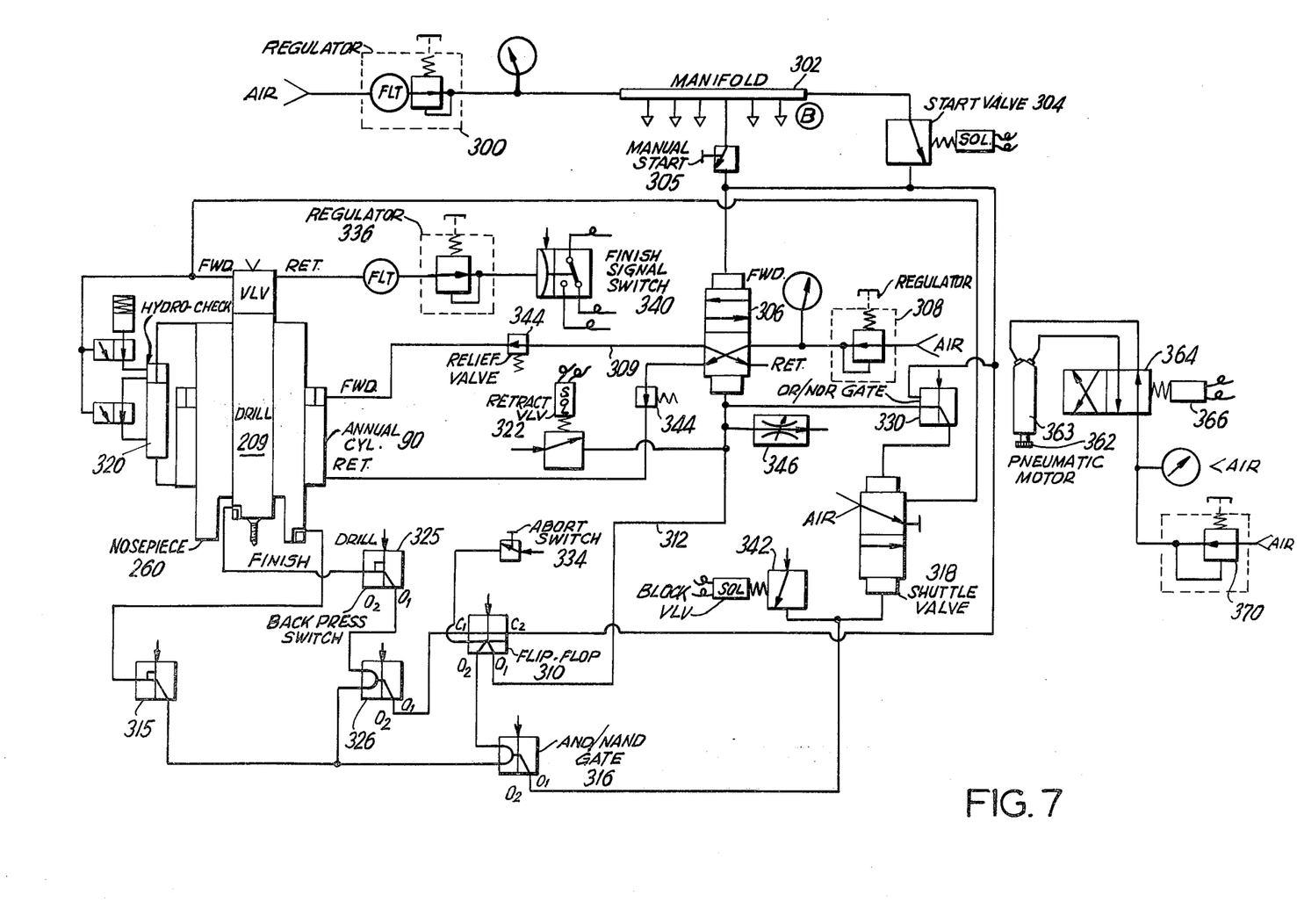
FIG. 7 is a schematic block diagram of the manipulator head Z axis control system.

The operation of the drill and fluidic sensing device may be best understood with reference to FIG. 7, which illustrates the control for the operation of the annular piston and drill. A regulator 300 receives 90 psig air from a source and regulates the pressure down to 5 psig for distribution from a manifold 302. It should be noted that in FIG. 7 the small zero found at the fluidic devices and valves terminals designate vents to atmospheric pressure.

The drilling sequence is started by providing an electrical impulse to solenoid start valve 304, or a manual pulse to the manual start valve 305, this permits 5 psig air to shuttle a four-way valve 306. 90 psig oiled air is received by regulator 308 and reduced to about 15 psig and directed to valve 306. When a start signal shuttles valve 306, 15 psig air is directed to annular cylinder 90 through line 309 to advance the cylinder, which contains drill 209, towards the workpiece. At the same time, air from the retract side of annular cylinder 90 is vented to atmosphere by valve 306. The start signal also resets flip-flop fluidic device 310 through line 312 thus switching its output signal from $O_1$ to $O_2$ thereby removing the retract signal from valve 306. Annular piston 98 advances towards the workpiece, and as nose piece 260 contacts the workpiece, a back pressure signal from chamber 258 is sensed by back pressure switch fluidic device 315, which in combination with the existing flip-flop 310 $O_2$ output; switches a AND/-NAND gate fluidic device 316 output from $O_2$ to $O_1$ sending a signal to a two-way valve 318 allowing dry 90 psig air to stop the forward motion of the annular piston by stopping the flow of hydraulic oil in a hydrolcheck cylinder 320 and starting drill motor 209 rotation and advancement.

As the drill operation is completed, the back pressure signal generated in chamber 276 is sensed by back pressure switch 325 causing its output to change from $O_2$ to $O_1$ thereby sending a signal in combination with back pressure switch 315 $O_1$ signal causing a AND/-NAND gate 326 to switch its output signal from $O_2$ to $O_1$. Device 326 causes the annular piston to maintain pressure against the workpiece and also delays Z retraction momentarily to ensure a smooth countersink. AND/NAND gate 326 $O_1$ signal is directed to the $C_1$ port of flip-flop 310, $O_1$ signal also shuttles both the two-way valve 318 and four-way valve 306, in turn releasing the hydro-check valve 320, stopping drill rotation and advancement and causing the annular piston to retract. Flip-flop 310 $O_1$ signal to the two-way valve 318 is interrupted by OR/NOR gate 330. Gate 330 isolates the start signal from the retract signal, both of which require valve 318 to release hydrocheck valve 320 to complete their operation.

At any point in the sequence an electrical pulse to the retract valve 332 or a manual switching of a switch 334 will cause the drill to stop, the hydro-check 320 to release and annular piston to retract.

When the drill retract, 90 psig signal is sent to the regulator 336, lowering pressure to 5 psig for the finished signal switch 340, which electrically signal the end of the drill/countersink operation.

An electrical signal to the block valve 342 will send a signal to valve 318 causing the hydrocheck 320 to stop the forward or reverse motion of the annular cylinder 90 at anypoint. Two relief valves 344 are located in the annular cylinder lines as a precaution that pressure will not exceed 40 psig. A variable orifice 346 allows pressure to bleed off the retract side of valve 306 so that the valve may be commanded forward more readily.

SCAN CAMERA

FIG. 5 illustrates the scan camera 350 mounted within the annular cylinder 100 of the manipulator head 26. The camera is of the linear photodiode type such as that sold by Reticon Corp., MOdel LC 600. The camera contains a linear array of 512 diodes in a single line with center to center spacing of about 1 mil. The field of view, i.e., the workpiece edge, is imaged by the camera lens into the photodiode array which is scanned electrically to produce a train of analog electrical pulses each having an amplitude proportional to the light intensity on the corresponding photodiode.

The lens end of camera 350 is positioned in a tabular adaptor 352, which is positioned within spherical bearing 222. Adaptor 352 is secured within bearing 222 by a flange 352a on the adaptor and a light source assembly 354. Assembly 354 is attached to adaptor 352 by fasteners 355. Light source assembly 354 includes a plurality of illuminating lights 356 (only two being illustrated) contained within a conical shaped light reflector hood 357. Hood 357 directs the light onto the structure edge 358 which reflects a portion of the light back into the camera for registration on the linear array of photodiodes.

The opposite end of camera 350 has a downwardly facing U-shaped bracket 359 attached thereto. A rod 360 extends from the center of the base portion of bracket 359 into tubular member 208 of the manipulator head. Rod 360 is rotatably carried therein by means of bearings 211 and 212. A spur gear 361 is positioned coaxial about rod 360 on the base of bracket 359 and meshes with a drive gear 362 which is driven by a pneumatic motor 363. Motor 363 is attached to member 208 and is utilized to rotate the camera 350 to change the orientation of the photodiode array when the scanning operation is changed from vertical to horizontal.

The control of pneumatic air for motor 363 is shown in FIG. 7 and includes a shuttle valve 364 operated by a solenoid 366 from the operator control panel. Valve 364 receives pressurized air from a source through regulator 370.

FIG. 5 also shows a hydro-check piston and cylinder 320 which is attached to plate 80 at one end and to a bracket 320a extending from plate 221 at the other end. In this manner hydro-check 320 is parallel to annular cylinder 100 and locks the cylinder in position as discussed above. A potentiometer 371 is also positioned parallel to cylinder 100 and a wiper 371a extending from bracket 320a provided a position feedback signal to the central control system.

The master coordinate map is corrected based on the data received from a digital scanning camera looking at the edge of the member to be drilled. The camera contains as its light converter, a linear array of 512 photodiodes. Each diode develops an electrical charge across an associated capacitor proportional to the intensity of the light and proportional to the time that is exposed to the light. The charge on each diode is sent sequentially to a charge amplifier which produces short pulse whose height is proportional to the charge on the diode. The diode is reset to zero charge, and the next diode in turn is interrogated in the same fashion. The entire array is scanned in this fashion, producing a train of output pulses from the camera. These pulses are sent to a controller 350a, FIG. 8, which, after proper signal conditioning, compares the voltage of each pulse to a preset value and counts the number of diodes which produce voltages either above or below this threshold. In the existing system the number of diodes above the threshold are counted.

The sensitivity of the camera can be increased by increasing the light intensity and/or slowing the scan rate. A scan rate of 100 scans per second and a light intensity of 350 mw/cm$^2$ derived from the lighting arrangement has proven to be adequate.

SCAN OPERATION

Figure 8:
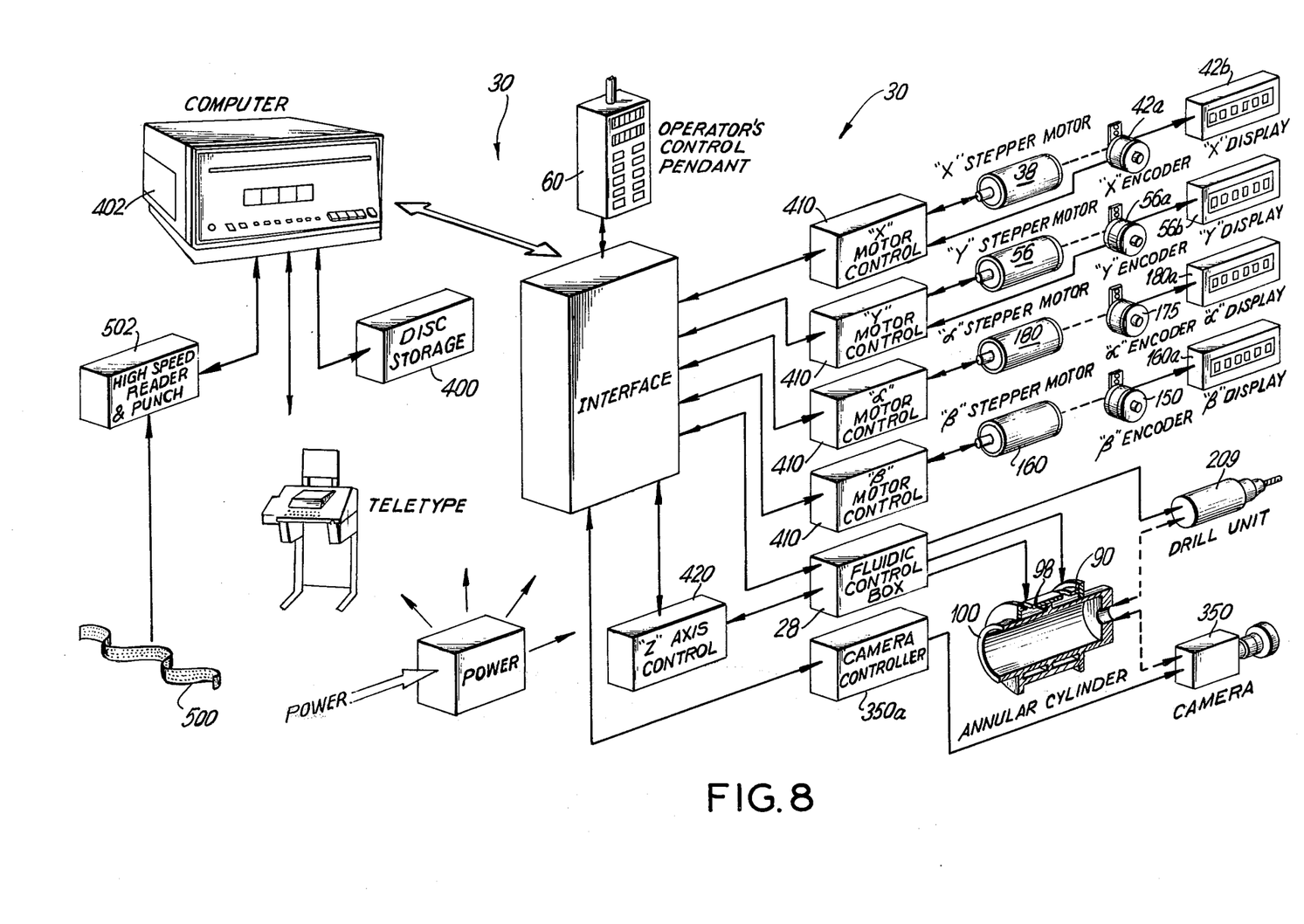
FIG. 8 is an exploded schematic view illustrating the control system components.

Upon receipt of an automatic start request, the master coordinate map containing the theoretical drill coordinates and control information is read into core from the disc storage 400. Prior to any motion, the coordinates are modified to position the digital scanning camera 350 to the edge 358. The coordinates are then modified as a function of camera/drill focal length normality angles, $\alpha$ $\beta$, hole diameter, and angle $\rho$ of the stringer or rib being scanned. External counters and DAC's (digital-to-analog converters) are loaded to initiate motions of the X, Y, $\alpha$, $\beta$, & Z axes toward the modified coordinates. After receipt of X, Y, $\alpha$, $\beta$, & Z done interrupts, a scan sync signal is outputed commanding the scanning camera sequence to begin. When the scan sync signal is received, the lamps 356 are energized. One second after the lights 356 are turned on, the camera 350 will be interrogated, and its output stored in core memory of the central control system. The lights are turned off and the manipulator head goes to the next coordinate to be scanned.

After receipt of a scan ready interrupt signifying completion of a camera scan, the original hole coordinates are adjusted such that the hole will be drilled on a line normal to the edge of the stringer and passing through the theoretical coordinates of the hole at the required distance from the stringer edge. The corrected drill coordinates are stored on the disc 400.

All operator specified hole coordinates are scanned and corrected in a similar fashion. The manipulator head is then returned to zero.

It is not necessary to scan all hole locations since the understructure will normally be good enough to be located by taking a scan every few feet. The software therefore allows the programmer to append each coordinate with a code defining how it should be handled, as below.

1. A coordinate set can be scanned
2. The coordinate will not be scanned, but a correction will be applied, which will be the same correction as applied to the last hole to be scanned
3. The coordinate will not be scanned, but the coordinate will be corrected, an amount proportional to the average correction applied to the hole previously scanned and the next hole to be scanned
4. A coordinate can be programmed so as not to be scanned and the coordinate will be dropped after the move is made.

To save time during the scan operation, only the coordinates programmed for situation (1) or (4) above, will be moved to.

X, Y, $\alpha$, $\beta$ DRIVE CONTROL

The computer 402 of the central control system (FIG. 8) processes the coordinate information and loads the drive system with the necessary information for driving the stepper motors to position the drill or scan camera. The prime movers for X, Y, $\alpha$, and $\beta$ are stepper motor 38, 56, 160 and 180, respectively, which take 200 steps per shaft revolution. For the X and Y axes the motor output shafts are geared down to produce a linear motion of 0.001 inch for each step of the motor. In the $\alpha$ axis, each motor step produces an angular change of 0.00641 degree on the camera or drill unit, while for $\beta$ each step results in an angular deplacement of 0.00669 degrees. The necessary drive current is supplied by transistorized translator and driver circuits 410. Each circuit causes the stepper motor to take one step for each input pulse it receives. The direction of rotation is controlled by the input logic level to another input. These two inputs are compatible with transistor-transistor logic (TTL) and diode-transistor logic (DTL).

The motor control circuits contain counters which are loaded from the computer, with the number of steps the motors are to take. The computer, also sets or resets a flip-flop depending upon the direction of rotation desired. The X and Y axes each contain an encoder 42a and 56a whose outputs are fed back and used to count down the counters. Deceleration of the mass is accomplished by the control system logic which causes the motors to begin slowing down when the counters count down to a set amount. Stopping occurs when the counter is empty. The point at which the motors begin to decelerate is controlled by the computer. However, the rate of deceleration as well as the rate of acceleration, are independently set by the hardware to an optimum point. Encoder feedback minimizes the adverse effects of the backlash inherent in the drive system, by forcing the stepper motors to drive until the drill unit or camera are properly positioned. Due to the high resolution and low backlash experienced in the $\alpha$ and $\beta$ axis, these stepper motors are driven open loop.

Stepper motor control is preferred because of the relative ease of interface to the computer and because of the less critical dynamic analysis. With stepper motors it is unnecessary to perform the difficult task of analyzing dynamic overshoot, or selecting components for obtaining critical damping, as would be required for servo motor control. The use of tachometer feedback is therefore eliminated. One must, however, be concerned with the problem of ensuring that the motor can handle the torque, selecting the acceleration and deceleration, and avoiding the motor resonant areas. Suitable stepper motors are those sold by Sigma Instruments, Inc.

Z AXIS CONTROL

The Z axis is positioned as described above by an annular cylinder under the control of a fluidic circuit shown in FIG. 7.

On a typical drill/countersink operation the sequence is as follows:

An electrical or manual pulse sends a pneumatic pulse to the annular cylinder control valve 306 which in turn pressurizes the cylinder 90 advancing the drill unit forward. As the nose piece 260 contacts the material a fluidic bleed chamber 258 is closed off. The build up in pressure thus caused is detected by a fluidic back pressure switch which in combination with other fluidic devices sends a pressure signal to start the drill motor and lock up the hydro-check.

When the countersink reaches the correct depth, another fluidic bleed chamber 276 is blocked creating a back pressure signal which is sensed by a fluidic device. This fluidic signal is used to reset the annular cylinder control valve, enabling air pressure to retract the cylinder. The same signal retracts the drill motor splindle.

As the drill motor retracts a pressure signal is sent to a pressure to electric switch which signals the computer to move the head to the next location.

The Z axis gets its command from the computer through programmed D/A (digital to analog) converter 420. This converts the digital signal to an analog voltage. The analog voltage is applied to a circuit which produces a high logic level on the one line if the cylinder must be extended and a high logic level on the other line if the cylinder must be retracted. These lines are applied to the fluidic circuit (valves 304, 332) to actuate the pneumatic signal to the cylinder 90 and the hydro-check 320. A feedback signal is provided by a linear potentiometer with a stroke of 12 inches. When the voltage on the potentiometer wiper is equal in magnitude to the output of the D/A converter, Z motion ceases, and a computer interrupt is generated. This causes the computer to acknowledge that the cylinder is in the correct Z position, and enable the camera control system 350a.

There is a dead zone region in which the cylinder does not move. This is adjustable, and designed to prevent oscillation of the cylinder. It has been found, that the optimum setting for the dead zone results in a Z axis position uncertainty of only 0.03 inches, well within scan camera tolerance limitations.

OVERALL OPERATING SEQUENCE

The control systems described above function in an overall sequence outlined as follows with reference to FIG. 8:
1. Tape 500 input to computer 402 through reader 502 defines nominal hole position, and data for scan and drill operations;
2. Tape input data is stored on magnetic disc 400;
3. At start of scan cycle scan camera 350 is inserted into manipulator head 26 and scan position data is sent from disc to computer;
4. The computer 402 issues scan camera position signals, X, Y, $\alpha$, $\beta$ stepper motor drives;
5. The computer issues signal to head assembly air cylinder for rapid advance to preprogrammed Z axis position;
6. The computer sends a signal to activate scan camera causing edge of structure to be illuminated. Light reflected from structure into camera determines position of structure edge relative to nominal preprogrammed position;
7. The camera transmits signal to computer identifying actual position of structure; and
8. The computer performs the necessary mathematical calculations to correct the nominal hole position to a position which will be a function of the actual structure position. This data is then sent to disc storage for use during the drilling phase. It should be noted that scanning for the structure or workpieces edge position does not necessarily have to be done for every hole but rather on a sampling basis for a row of holes with all holes in a given row receiving the same correction factor or on proportional basis between two scanned holes.

The above steps 3 thru 7 are repeated until all of the preprogrammed scan points have been obtained and all holes corrected.

a. At start of drilling cycle a drill unit 209 is inserted in head assembly and the corrected hole position data is sent from disc to the computer;
b. The computer issues signal to X, Y, $\alpha$, $\beta$ stepper motor drives;
c. The computer issues signal to head assembly air cylinder to rapid advance to workpiece on Z axis;
d. The workpiece sensor 260 detects contact of drill unit nose piece with workpiece and sends a pneumatic signal to stop Z axis motion and hydraulically lock head assembly air cylinder position;
e. The workpiece sensor 260 also sends pneumatic signal to start advance of drill into the workpiece;
f. The countersink depth sensor 276 detects preset drill stroke for the purpose of producing a precise countersink depth in the hole. The sensor sends a pneumatic signal to the drill unit, stopping the drill feed and causing it to retract;
g. The countersink depth sensor sends a pneumatic signal to the head assembly causing the air cylinder to hydraulically unlock and retract; and
h. Retraction of drill unit causes a signal to be sent to the computer identifying completion of hole drilling cycle.

The above steps b thru h are repeated until all of the holes are drilled.

From the above description, it will be apparent that other modifications may be made by those skilled in the art without departing from the scope and spirit of the present invention as pointed out in the appended claims.

What is claimed is:

1. A machine tool manipulator arrangement comprising: a manipulator head; said manipulator head including a cylindrical member positioned in the Z direction and defining an annular piston on the outer surface thereof, said cylindrical member carrying an axially located spherical bearing at one end; a tool detachably secured to said spherical bearing at its working end; means for rotating said tool in said bearing within a predetermined range, said rotating means being located at the opposite end of said cylindrical member;

means defining an annular cylinder, said piston being slidably positioned within said annular cylinder, and means for directing pressurized fluid to said annular cylinder to cause said cylindrical member to move in said Z direction.

2. The device of claim 1, further including means for moving said head in an X and Y direction.

3. The device of claim 1, wherein said tool is a scanning camera having an array of linear photodiodes, and means are provided for rotating said camera within said cylindrical member to change the orientation of said linear array.

4. The device of claim 1, wherein said tool is a drill unit having self-contained drill advancement and retraction means.

5. The device of claim 4, wherein said tool includes means for sensing the surface of a workpiece; and means coupled to said sensing means for terminating advancement of the cylindrical member.

6. The device of claim 5, wherein said sensing means includes a nose piece positioned adjacent the end of said drill and axial movably relative thereto; means adjacent said nose piece defining a fluidic exhaust chamber; said nose piece being adapted to contact said workpiece and close said exhaust chamber to create a back pressure when the workpiece is contacted; said back pressure providing a signal input to said terminating means.

7. The device of claim 5, when said drilling unit is adapted to drill a countersink, and means are provided for sensing the advancement of said drill unit corresponding to the countersink depth, and means coupled to said sensing means for terminating advancement of the drill after the countersink operation is completed.

8. A multidegree of freedom tool manipulator, which comprises: a fixture adapted to secure a workpiece; a manipulator head; means for mounting said manipulator and moving said manipulator in the X-Y direction on said fixture; said manipulator head including a cylindrical member positioned in the Z direction and defining an annular piston on the outer surface thereof; said cylindrical member carrying an axially located spherical bearing at one end and having means for angular manipulation at the other end, tool means carried in said bearing and operated by said angular manipulator means; means defining an annular cylinder, said annular piston being slidably positioned within said annular cylinder and means for directing pressurized fluid to said annular cylinder to cause said cylindrical member to move in said Z direction.

9. The device of claim 8, wherein said manipulator head is positioned on a carriage for movement in the X-Y direction.

10. The device of claim 8, wherein the ratio of the distance between said manipulator means and the spherical bearing and surface of the workpiece is 8:1.

11. The device of claim 8, wherein said manipulator means are adapted to rotate said tool with the range of ±9° relative to the Z axis.

12. The device of claim 11, wherein said manipulator means includes means for rotating said tool in two directions.

* * * * *